US010580406B2

(12) United States Patent
Fry (10) Patent No.: US 10,580,406 B2
(45) Date of Patent: Mar. 3, 2020

(54) UNIFIED N-BEST ASR RESULTS (71) Applicant: 2236008 Ontario Inc., Waterloo (CA)

(72) Inventor: Darrin Kenneth John Fry, Kanata (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 15/807,025

(22) Filed: Nov. 8, 2017

(65) Prior Publication Data
US 2019/0057691 A1 Feb. 21, 2019

Related U.S. Application Data (60) Provisional application No. 62/547,422, filed on Aug. 18, 2017.

(51) Int. Cl.
G10L 15/00 (2013.01)
G10L 15/26 (2006.01)
G10L 21/00 (2013.01)
G10L 21/06 (2013.01)
G10L 25/00 (2013.01)
G10L 15/22 (2006.01)
G10L 15/18 (2013.01)
G10L 15/32 (2013.01)
G10L 15/30 (2013.01)

(52) U.S. Cl.
CPC .......... G10L 15/22 (2013.01); G10L 15/1815 (2013.01); G10L 15/32 (2013.01); G10L 15/1822 (2013.01); G10L 15/30 (2013.01); G10L 2015/223 (2013.01)

(58) Field of Classification Search
CPC ......... G10L 15/08; G10L 15/26; G10L 15/30; G10L 15/32; G10L 17/22; G10L 15/1822; G10L 15/01; G10L 15/265
See application file for complete search history.

(56) References Cited

U.S. PATENT DOCUMENTS

| 9,070,366 | B1* | 6/2015 | Mathias | G06F 17/279 |
| 9,117,453 | B2 | 8/2015 | Bielby | |
| 9,721,570 | B1* | 8/2017 | Beal | G10L 17/005 |
| 10,032,451 | B1* | 7/2018 | Mamkina | G06F 21/32 |
| 2002/0193991 | A1* | 12/2002 | Bennett | G10L 15/08 |
| | | | | 704/247 |
| 2006/0122837 | A1* | 6/2006 | Kim | G10L 15/22 |
| | | | | 704/270.1 |

(Continued)

OTHER PUBLICATIONS

EPO, Extended European Search Report relating to EP application No. 18187088.2, dated Dec. 19, 2018.

(Continued)

Primary Examiner — Olujimi A Adesanya
(74) Attorney, Agent, or Firm — Rowand LLP (57) ABSTRACT A system and method receives a spoken utterance and converts the spoken utterance into recognized speech results through automatic speech recognition modules. The system and method renders a composite recognition speech result comprising the recognized speech results joined in a return function. The system and method interprets the recognized speech results joined in a return function from each of the automatic speech recognition modules through multiple conversation modules.

20 Claims, 5 Drawing Sheets

NLP: N-BEST NORMALIZATION

Example result set:    Domain Expert selected result    ASR config: nbest definitions Call Darrin's mobile phone : Conference 950
NLP classification: |CALL|, score 271067
CALL {
    PHONE_TYPE="MOBILE"
    NAME="Darrin"
}

@nbest
CALL {
    NAME
}
NAVIGATION {
    ADDRESS {
        PLACE REGION {
            PLACE
        }
        COUNTRY
    }
}

Call Karen's mobile phone : Conference 900
NLP classification: |CALL|, score 271067
CALL {
    PHONE_TYPE="MOBILE"
    NAME="Karen"
}

Call Karen's mobile phone : Conference 870
NLP classification: |CALL|, score 271067
CALL {
    PHONE_TYPE="MOBILE"
    NAME="Sharon"
}

NLP classification: |CALL|, score 271067
CALL {
    PHONE_TYPE = "MOBILE"
    NAME="Darrin" {
        NBEST_ALTERNATIVES {
            NAME = "Karen"
            NAME = "Sharon"
        }
    }
}

Composite result provided to Domain Expert (56) References Cited

U.S. PATENT DOCUMENTS

| | | | | |
|---|---|---|---|---|
| 2007/0162282 A1* | 7/2007 | Odinak | ............... | G10L 15/30 |
| | | | | 704/255 |
| 2008/0126091 A1* | 5/2008 | Clark | ............... | G10L 15/22 |
| | | | | 704/246 |
| 2010/0250243 A1* | 9/2010 | Schalk | ............... | G10L 15/22 |
| | | | | 704/201 |
| 2011/0161077 A1* | 6/2011 | Bielby | ............... | G10L 15/32 |
| | | | | 704/231 |
| 2012/0209609 A1* | 8/2012 | Zhao | ............... | G10L 15/08 |
| | | | | 704/249 |
| 2012/0245934 A1* | 9/2012 | Talwar | ............... | G10L 15/22 |
| | | | | 704/235 |
| 2012/0253823 A1* | 10/2012 | Schalk | ............... | G01C 21/3608 |
| | | | | 704/270.1 |
| 2014/0067392 A1* | 3/2014 | Burke | ............... | G10L 15/22 |
| | | | | 704/236 |
| 2014/0142945 A1* | 5/2014 | Fry | ............... | G10L 15/26 |
| | | | | 704/254 |
| 2014/0365209 A1* | 12/2014 | Evermann | ............... | G06F 17/279 |
| | | | | 704/9 |
| 2015/0221308 A1 | 8/2015 | Suzuki | | |
| 2016/0027440 A1* | 1/2016 | Gelfenbeyn | ............... | G10L 15/32 |
| | | | | 704/244 |
| 2018/0025731 A1* | 1/2018 | Lovitt | ............... | G10L 15/285 |
| | | | | 704/255 |

OTHER PUBLICATIONS

European Examination Report dated Dec. 12, 2019, European Patent Application No. 18187088.2.

\* cited by examiner

```
result:json: {"confidence":873, "recognizer":"Vocon3200",
"utterance":" navigate to one twenty 3 York St east Toronto",
"interpretation":{ "intent":"navigation","score":150340,
"fields":[
    {"key":"address",  "value":"123 York St east, Toronto",
        "fields":[ {"key":"NUMBER","value":"123"},
            {"key":"STREET", "value":"York St east",
                "fields":[ {"key":"STREET_SPECIFIC", "value":"St"},
                    {"key":"STREET_NAME","value":"York"},
                    {"key":"POST_CARDINAL","value":"east",
                        "fields":[ {"key":" CARDINAL_POINT", "value":"E" }]
                    }
                ]
            },
            {"key":"PLACE_REGION","value":"Toronto, ON",
                "fields":[ {"key":"REGION","value":"ON"},
                    {"key":"PLACE","value":"Toronto"}
                ]
            },
            {"key":"COUNTRY","value":"Canada"},
        ],
    },
]
}
```

```
result:json:{
"confidence":.506,
"id":3,
"recognizer":"Vocon3200",
"status":"result_ok", "type":"FINAL",
"action":"LIST",
"utterance":"call Yonnie",
"interpretation":{
    "intent":"LIST",
    "score":30120,
    "fields":[
        {"key":"INDEX","value":"1"},
        {"key":"ITEM","value":"Yonnie"}
    ]
}
}
```

UNIFIED N-BEST ASR RESULTS

PRIORITY CLAIM

This application claims priority to U.S. Provisional Patent Application No. 62/547,422, filed Aug. 18, 2017, titled "Unified N-Best ASR Results," which is herein incorporated by reference.

BACKGROUND OF THE DISCLOSURE

Technical Field

This disclosure relates to a speech recognition architecture and specifically to an automatic speech recognition architecture that normalizes the recognition results of multiple recognition systems.

Related Art

Automatic speech recognitions (ASR) systems allow users to interface electronic systems with their voices. Some systems use multiple speech-recognition services to convert spoken commands to texts. Some recognition services will convert spoken commands to multiple texts called hypotheses. Some recognition services will convert spoken commands to a single hypothesis with alternate words for some words in that hypothesis that are likely candidates to match what the users said. Some recognition services don not provide multiple hypotheses or alternate words. Processing the multitude of results that vary in form and may not be related in meaning can be difficult.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

ASR systems perform various functions to fulfill spoken commands. ASR systems process information from various recognition modules so that speech is recognized and spoken commands are carried out. Each recognition module may render multiple recognition results called n-best results. N-best results may provide multiple hypotheses as to what a user is requesting. The tentative result may comprise a single hypothesis with multiple possibilities of words for a recognized speech result. Other recognition modules may render multiple hypotheses of a single word, an entire phrase, a sentence, or even several sentences. Other recognition modules may provide multiple structured interpretations of what the user may have said. In addition, others provide a single structured interpretation of what the user may have said with alternate possibilities. Because of the proliferation of these possibilities, the disclosed ASR systems and methods (referred to as the ASR system) handle n-best results by extracting the salient information required by the relevant conversation module or modules, and in some systems, render a composite result.

Figure 1:
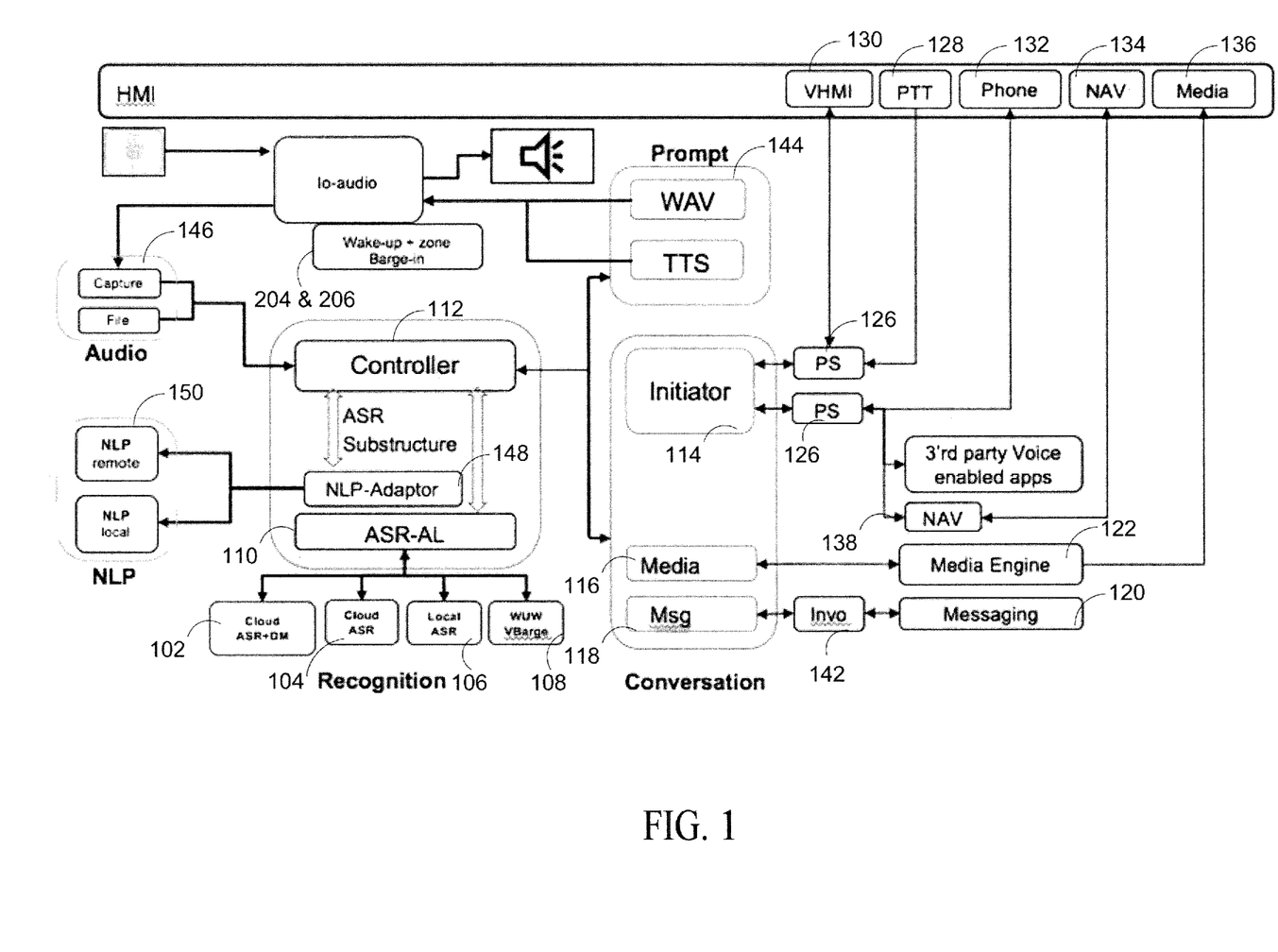
FIG. 1 is a block diagram of an ASR system.

In FIG. 1, recognition modules 102-108 interface an ASR abstraction layer 110. The recognition modules 102-108 include on demand and local recognition modules. The on demand recognition modules 102 and 104 provide shared computer-processing resources that are provided through the cloud (e.g., an internet-based computing). The local recognition module 106 and 108 provide local recognition services to the ASR controller 112.

The conversation modules 114-122 are the domain experts. The conversation modules 114-122 process the natural language interpretation speech provided by the recognition service or the natural language processor 150 in lieu of the interpretation provided by the recognition service to execute various functions. The conversation modules 114-122 handle specific types of recognized result, when results are received by recognition modules and conditionally processed by an NLP interpreter, the conversation modules rate the multitude of results based on each results' fitness for use by that conversation module. When n-best handling is selected, and the input-output ASR controller 112 determines the highest rated result is identified as requiring n-best handling, the input-output ASR controller 112 examines the multitude of results to find alternate versions of the highest rated result, the lesser rated n-best results, and augments the information in the highest rated result with information from the lesser rated n-best results as directed by an n-best description producing a composite result. The composite result is delivered to the conversation module 114-122 that gave the result the highest rating. The conversation module interprets the recognized speech results that originate from the service that rendered the final recognition result (with the corresponding intent information) through a single result function. Here, the ASR controller uses the n-best section of the ASR configuration file, which specifies which classifications require n-best handling and which specifies the fields in those results that should be augmented In FIG. 1, the domain experts include an initiator module 114 that transmits and subscribes to objects through many different interfaces such as the publish-and-subscribe services shown. The publish-and-subscribe module 126 interfaces push-to-talk logic 128 and voice Human Machine Interface (HMI) logic 130. The publish-and-subscribe module 126 also interfaces a phone module 132 and one or more external domain experts such as an external navigation module 134 accessed through a navigation interface 138. Media logic 136 interfaces a media engine 122 and the messaging conversation module 118 interfaces messaging logic 120 through an invocation framework 142. In some systems, conversation modules designated by the ASR controller 112 maintain state. A speech session may comprise the time in which the designated conversation modules process the recognized speech results.

The ASR controller 112 may be triggered by a recognition module that monitors audio for a wakeup phrase, an initiator module 114 that handles requests to initiate a speech session, or an actuation of a user interface button that causes an update to a publish-and-subscribe (PS) object. The system may prompt the user for a command or an utterance. A wav prompt module 144 may play tones or pre-recorded voice via .wav files, and a TTS prompt module may be used to synthesize voice for prompts provided in textual form via prompt module 144. The prompt module 144 may be used by service providers and other modules (e.g., conversation modules 114-122, recognition modules 102-108) to render appropriate prompts.

When a speech session is initiated via a PS update or wakeup phrase detection, the input-output ASR controller 112 notifies the audio capture module 146 that it should begin capturing the user's spoken utterance. The input-output ASR controller 112 then notifies each of the recognition modules 102-108 that they should begin recognizing the user's utterance through the ASR abstraction layer 100. Each of the recognition modules 102-108 converts the utterance to a text string and assigns the recognition result a confidence level to indicate how well the utterance was understood by the recognizer. If the confidence level through all the recognition results does not exceed a threshold, the input-output ASR controller 112 will generate an error result and provide the error result to the conversation modules that may seek to repeat the utterance or seek information related to it.

When successful results are available, the results are sent to the ASR abstraction layer 110. When the recognition results do not have a natural language payload or have a natural language payload that may be enhanced, the recognition results are pushed to the natural language processor adapter 148 that may access a local or a remote natural language processor 150. The natural language processor 150 may return a natural language component, which may designate an interpreted aim or purpose of an utterance known as an intent result (e.g., an intent may be play a media selection or dial a phone number) and/or provide data that is responsive or related to the intent result. The intent result for a given speech result is added to that speech result. (e.g., a 'result' contains both the ASR transcription, probabilities, etc., that come from transforming audio signals to text, but also contains the interpretation of that text complete with classification of intent and any extracted or generated data fields).

When n-best processing of the intent results is requested, all of the intent results may be processed to determine an exclusive conversation module and generate a composite intent result. The conversation modules 114-122 may first determine if the context of the utterance (e.g., search, multimedia, or phone) is relevant to its domain, which then determines which conversation module takes preference or precedence over the other conversation modules making it exclusive and completes the action or command associated with the utterance. When conversation module preference is determined, a conversation module may become an exclusive conversation module that consumes the result. The intent results may also be processed by the conversation modules 114-122 to determine which result will be used as the base for the generating the composite n-best result. The composite intent result incorporates the n-best intent results into a single intent result signifying the n-best alternate intent as alternate intent values for their respective fields.

When the n-best results are unified, it may be consumed by the exclusive conversation module. The exclusive conversation module becomes the only conversation module that handles the n-best results until the action associated with that utterance is executed or fulfilled. At this point, the exclusive conversation module either completes the action or triggers another speech recognition turn, which prompts the user for more information. This process continues until an action is executed or a command is fulfilled.

In FIG. 1, the conversation module exclusivity status is maintained and recorded by the ASR controller 112. The ASR controller 112 records, which speech recognitions results and intent results that were selected by the conversation module and where the selected speech recognitions originated. The ASR controller 112 also monitors when a speech recognition session begins and ends. Exclusivity status may persist through multiple speech sessions or may be dropped at the end of a speech session.

By unifying or normalizing the n-best intent results into one or more composite results, the ASR system reduces bandwidth use (as there are fewer callback and send functions to access recognition and intent results) and improves efficiency (as the processors execute less input and output calls). The ASR system also improves scalability and is not tied to module specific structures that requires presentments in a vendor-specific recognition service formats. As such, the ASR system does not require legacy conversation modules (e.g., the domain experts of the ASR system).

Figure 2:
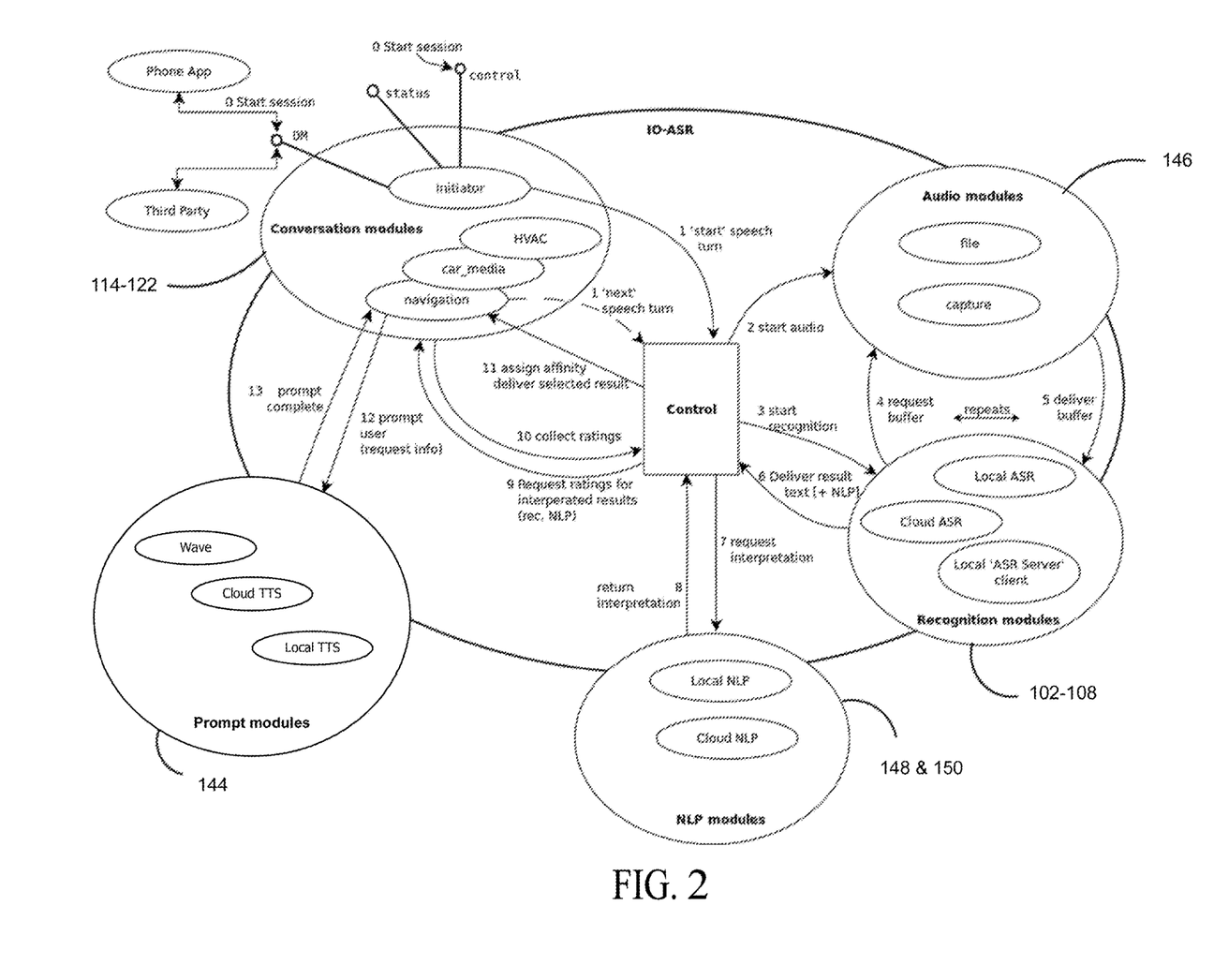
FIG. 2 is an ASR service flow.

FIG. 2 is an ASR service flow that operates on a cyclical basis, performing the same sequence of operations as often and as required to interpret the recognized speech utterance and execute the appropriate action. In FIG. 2, a turn triggered by the conversation modules 114-122 (that includes the initiator 114) initiates the ASR flow at 1. The initiator 114 monitors a control line, a phone application, or third party system for ASR events and then starts a speech recognition turn by sending a turn request to the ASR controller 112.

The ASR system notifies the audio capture module 146 at 2, which then begins to capture the user's spoken utterance. The input-output ASR controller 112 passes control to the local and cloud recognition modules 102-108 at 3 and 3a. If the user's spoken utterance is not captured, the recognition modules 102-108, may return an error result to be processed. If no recognition modules 102-108 return a result, the input-output ASR controller generates an error result for the conversation modules 114-122 to process.

On a successful capture, each of the recognition modules 102-108 converts the utterance to a text string via repeated exchanges at 4 and 5 and assigns the recognition result a level of confidence to indicate how well the utterance was understood by the recognizer modules 102-108 before it is returned to the input-output ASR controller 112 at 6. If the confidence level through all the recognition results does not exceed a threshold level, the input-output ASR controller 112 generates an error result for the conversation modules to process 11. The conversation module that handles the error result may ask that the utterance be repeated or seek information related to it.

When the recognition results do not have a natural language payload or have a natural language payload that may be enhanced, the recognition results are pushed to the natural language processor adapter 148 that may access a local or a remote natural language processor 150 at 7. The natural language processor 150 may return a natural language component at 8, which may designate an intent or an interpreted aim or purpose of an utterance (e.g., an intent may be to play a media selection or dial a phone number) and/or provide data. The data may be related to a recognition result (e.g., the score of a baseball game in Chicago, Ill. if the recognized result is requesting a score for the Chicago Cubs).

All of the results of the recognition modules and their natural language interpretations are provided to conversation modules 114-122 at 9. The conversation modules 114-122 rate the results based on their relevance and fit for their domain at 10, which may also determine which conversation module takes preference or precedence over the other conversation modules and completes the action or command associated with the utterance (e.g., the exclusive conversation module). The results are also rated. The highest rated result is processed as the base for the n-best processing and augments the result selected by the conversation modules or exclusive conversation module to include the data from the other n-best results relevant to the selection. The newly augmented result is then processed by the conversation module 114-122 or exclusive conversation module at 11. Conversation modules determine exclusivity, release exclusivity, status, start another speech recognition turn, end a speech session, etc.

Figure 3:
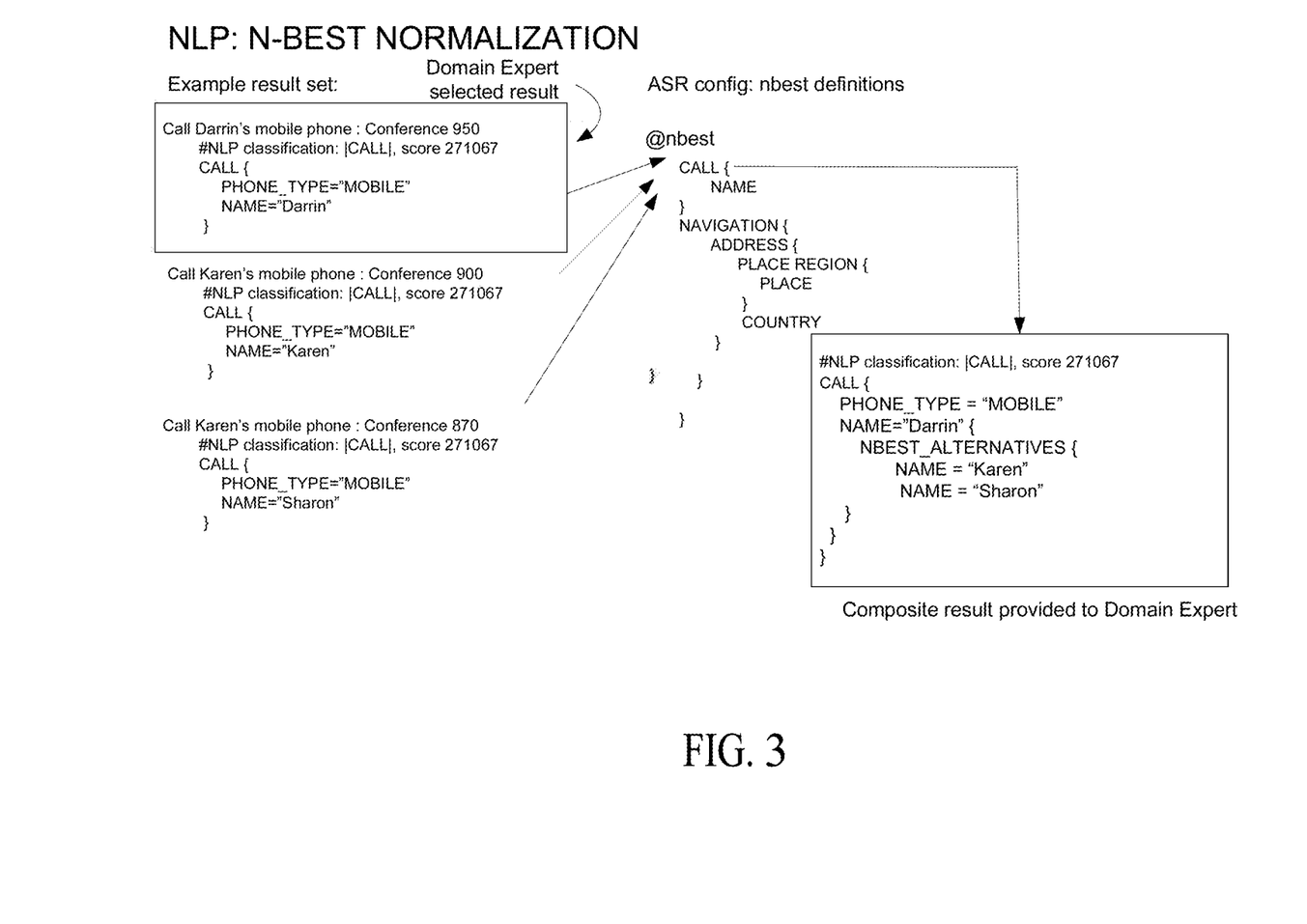
FIG. 3 is a block diagram of composite recognition result data structure.
Figure 4:
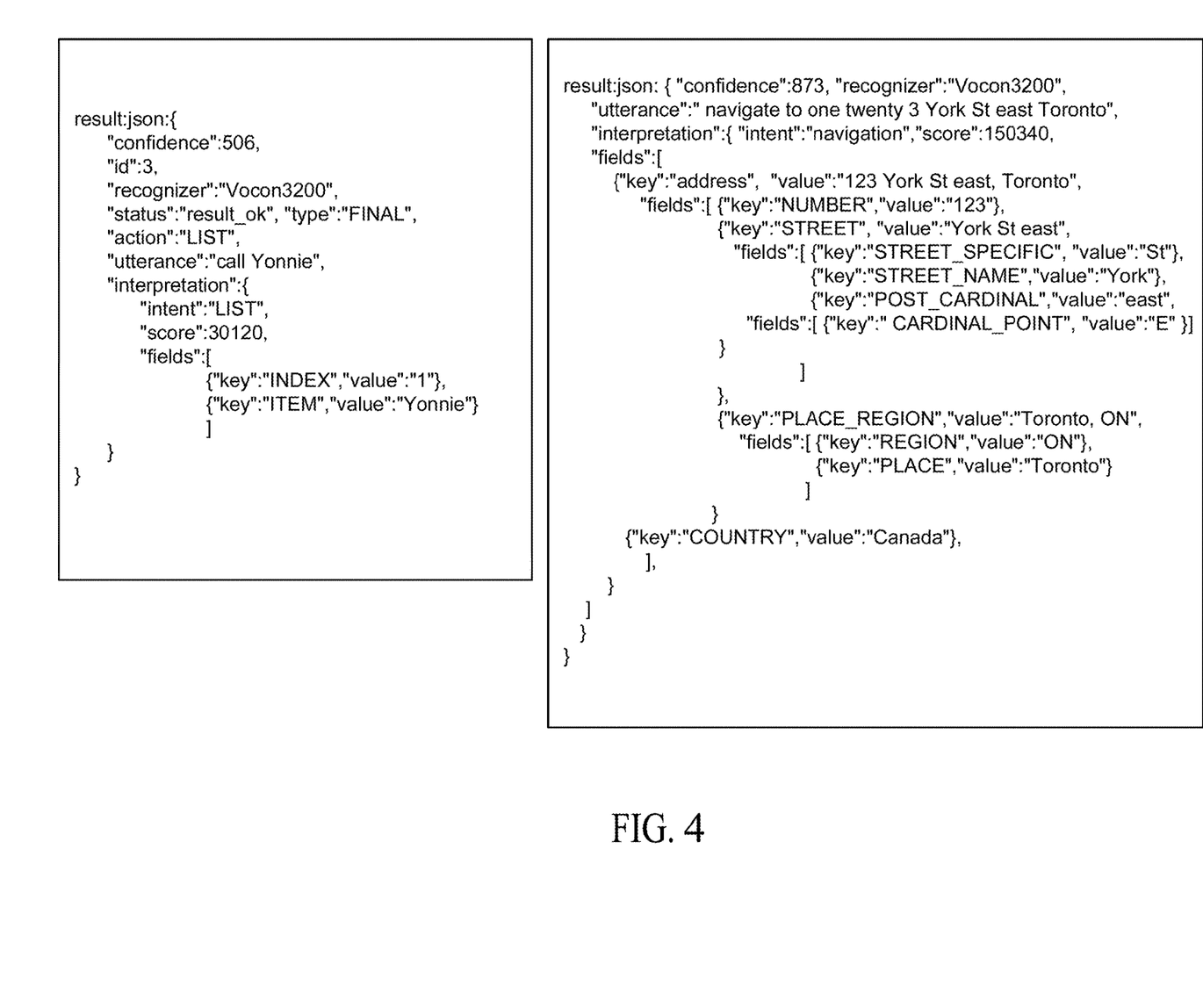
FIG. 4 is a second block diagram of composite recognition result data structure.

FIGS. 3 and 4 are block diagrams of composite recognition result data structure (e.g., a result function) or a return function. The composite navigation recognition result structure joins the n-best results into a single output. The result structure passes the composite recognition result beginning with the highest confidence level and the n-best alternates that are below it as alternate values for their respective fields. So, in FIG. 3, the composite navigation recognition result structure joins the "PLACE-REGION"/"REGION"/"PLACE" by pulling each individual results together for each of the individual fields (e.g., each city and province for the "PLACE-REGION" field: Vancouver, BC, Victoria, BC, etc.; each province for the "REGION" field: AB, BC, MB, etc.; and each city for the "PLACE" result). While a complex result shown may have n-best alternates for each field, other composite recognition results join only selected fields and similarly may include a composite intent result corresponding to the selected fields.

Figure 5:
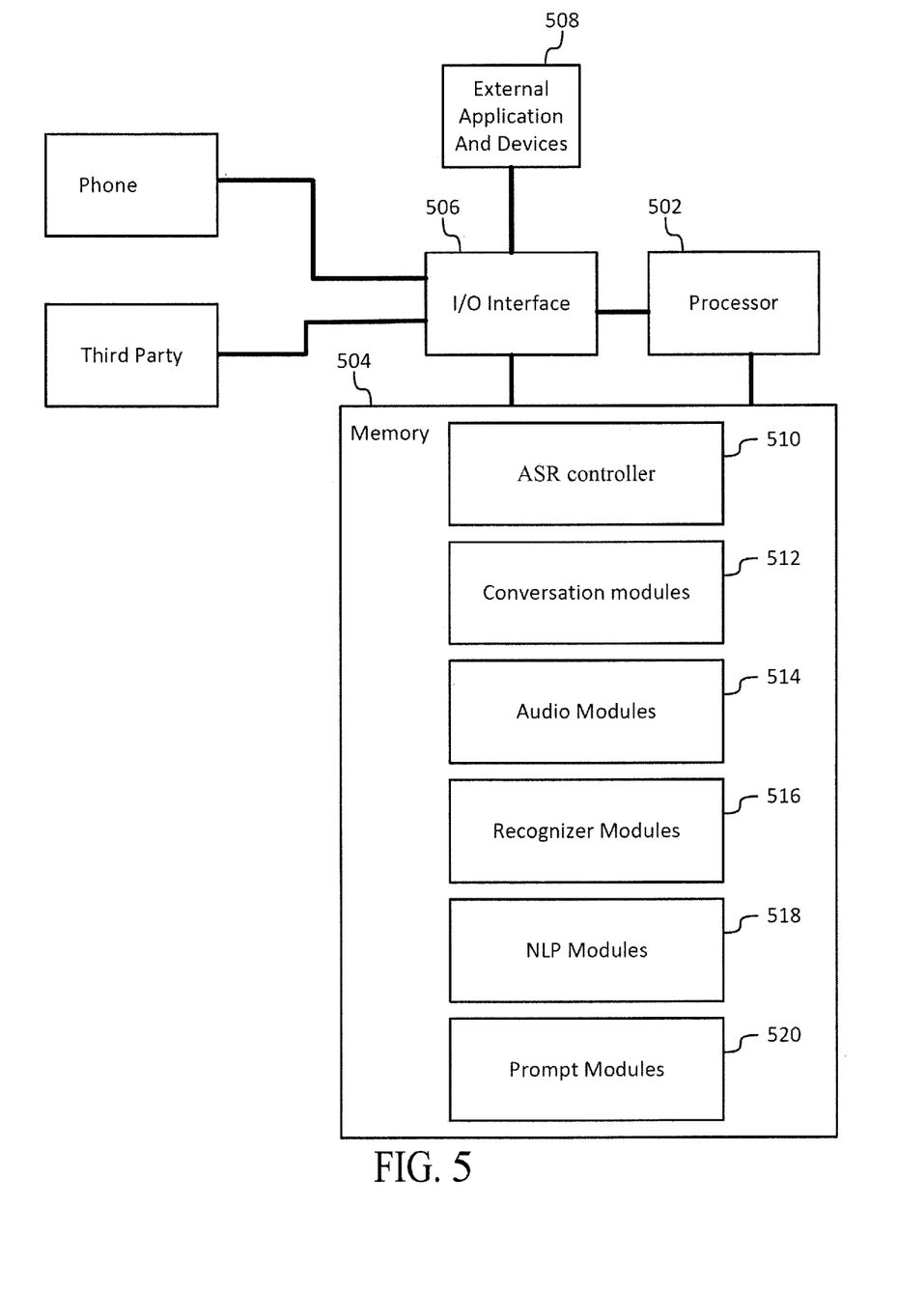
FIG. 5 is an alternate block diagram of an ASR system.

FIG. 5 is a block diagram of a vehicle that provides voice control services for search, media, voice dialing, etc. The system comprises a processor 502, a non-transitory media such as a memory 504 (the contents of which are accessible by the processor 502) and an I/O interface 506. The I/O interface 506 connects devices and local and/or remote applications such as, for example, modified or additional local and/or remote recognition modules and local and/or remote conversation modules. The memory 504 may store instructions which when executed by the processor 502 causes the system to render some or all of the functionality associated with converting STT, converting TTS, interpreting the recognized speech, and executing the appropriate action. For example, the memory 504 may store instructions which when executed by the processor 502 causes the system to render the functionality associated with the ASR controller 510, the conversation modules 512, the audio modules 514, the recognizer modules 516, the NLP modules 518, and the prompt modules 520.

The processors 502 may comprise a single processor or multiple processors that may be disposed on a single chip, on multiple devices, or distributed over more than one system. The processors 502 may be hardware that executes computer executable instructions or computer code embodied in the memory 504 or in other memory to perform one or more features of the systems described herein. The processor 502 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 504 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 504 may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or message. It is not sufficient that a function or act merely follow or occur subsequent to another. Further, when functions indicate an automated echo cancellation occurs, echo is removed by subtracting an estimated echo from the transmitted or received signal.

The memory 504 may also store a non-transitory computer code, executable by processor 502. The computer code may be written in any computer language, such as C, C++, assembly language, channel program code, and/or any combination of computer languages. The memory 504 may store information in data structures including, for example multiband compressor/limiter tunable parameters including one or more one or more crossover frequencies, amplitude thresholds, compression ratios, time constants, attack and release times, look-ahead parameters, etc.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The ASR system offers speech recognition services that support local and remote STT and TTS. The ASR system uses application-specific conversation modules to provide speech handling throughout the system. The conversation modules are decoupled from the speech-recognition provider so the modules will work with multiple ASR providers. The system allows functionality to be added or removed and simplifies the processing of n-best results without changing domain experts. This system allows modules to be extended or added to legacy modules without changing the way the ASR system operates. The modules may be used within telephone systems and vehicles and may interface infotainment processor and digital signal processors or DSPs that co-exist and communicate with other system software. A vehicle may include without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The system is easy and quickly adapted to different vehicle and cabin types and different acoustic environments configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system of automatic speech recognition, comprising:
an audio capture unit for capturing a spoken utterance;
a processor coupled to the audio capture unit, the processor being configured to:
convert, via one or more recognition modules, the spoken utterance into a plurality of recognized speech results;
obtain, by one or more conversation modules, ratings for the plurality of recognized speech results based on each recognized speech result's fitness for use by the conversation modules;
identify a first recognized speech result having the highest rating by the one or more conversation modules;
identify a preferred conversation module for consuming a recognition speech result for the spoken utterance based on the ratings for the plurality of recognized speech results;
in response to determining that an n-best processing of the first recognized speech results is selected:
generate a composite recognition speech result that includes the first recognized speech result supplemented with alternate values for at least one recognized data field for the first recognized speech result, the alternate values being extracted from other ones of the recognized speech results; and
provide, to the preferred conversation module, the composite recognition speech result.

2. The system of claim 1 where the composite recognition speech result incorporates n-best results into a single structure signifying n-best alternate recognition values for the at least one recognized data field.

3. The system of claim 2 where the n-best results comprise a plurality of hypotheses as to the meaning of the spoken utterance.

4. The system of claim 1 where the processor is further configured to render a composite intent result.

5. The system of claim 4 where the composite intent result incorporates n-best results into a single intent result indicating one or more alternate intent values.

6. The system of claim 4, wherein the composite intent result is added to the composite recognition speech result as output.

7. The system of claim 1 where the system comprises a vehicle.

8. The system of claim 1, wherein outputting the composite recognition speech result comprises performing, by the processor, an action based on the composite recognition speech result.

9. A method of processing speech recognition results, the method comprising:
receiving, via an audio capture unit, a spoken utterance;
converting, via one or more recognition modules, the spoken utterance into a plurality of recognized speech results;
obtaining, by one or more conversation modules, ratings for the plurality of recognized speech results based on each recognized speech result's fitness for use by the conversation modules;
identifying a first recognized speech result having the highest rating by the one or more conversation modules;
identifying a preferred conversation module for consuming a recognition speech result for the spoken utterance based on the ratings for the plurality of recognized speech results;
in response to determining that an n-best processing of the first recognized speech results is selected:
generating a composite recognition speech result that includes the first recognized speech result supplemented with alternate values for at least one recognized data field for the first recognized speech result, the alternate values being extracted from other ones of the recognized speech results; and
providing, to the preferred conversation module, the composite recognition speech result.

10. The method of claim 9 where the composite recognition speech result incorporates n-best results into a single structure signifying n-best alternate recognition values for the at least one recognized data field.

11. The method of claim 10 where the n-best results comprise a plurality of hypotheses as to the meaning of the spoken utterance.

12. The method of claim 9 where the processor is further configured to render a composite intent result.

13. The method of claim 12 where the composite intent result incorporates n-best results into a single intent result indicating one or more alternate intent values.

14. The method of claim 12, wherein the composite intent result is added to the composite recognition speech result as output.

15. The method of claim 9 where the automatic speech recognition system comprises a vehicle.

16. The method of claim 9, wherein outputting the composite recognition speech result comprises performing, by the processor, an action based on the composite recognition speech result.

17. A non-transitory machine-readable medium encoded with machine-executable instructions which, when executed by a processor, will cause the processor to:
receive, via an audio capture unit, a spoken utterance;
convert, via one or more recognition modules, the spoken utterance into a plurality of recognized speech results;
obtain, by one or more conversation modules, ratings for the plurality of recognized speech results based on each recognized speech result's fitness for use by the conversation modules;
identify a first recognized speech result having the highest rating by the one or more conversation modules;
identify a preferred conversation module for consuming a recognition speech result for the spoken utterance based on the ratings for the plurality of recognized speech results;
in response to determining that an n-best processing of the first recognized speech results is selected:
generate a composite recognition speech result that includes the first recognized speech result supplemented with alternate values for at least one recognized data field for the first recognized speech result, the alternate values being extracted from other ones of the recognized speech results; and
provide, to the preferred conversation module, the composite recognition speech result.

18. The non-transitory machine-readable medium of claim 17 where the composite recognition speech result incorporates n-best results into a single structure signifying n-best alternate recognition values for the at least one recognized data field.

19. The non-transitory machine-readable medium claim 18 where the n-best results comprise a plurality of hypotheses as to the meaning of the spoken utterance.

20. The non-transitory machine-readable medium claim 17 where the non-transitory machine-readable medium is encoded in a vehicle.

\* \* \* \* \*